(12) United States Patent
Cousineau

(10) Patent No.: US 9,624,770 B2
(45) Date of Patent: *Apr. 18, 2017

(54) SELF-UNDERCUT ANCHOR SYSTEM

(71) Applicant: Robert Cousineau, Ottawa (CA)

(72) Inventor: Robert Cousineau, Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/392,124

(22) PCT Filed: Jun. 25, 2014

(86) PCT No.: PCT/CA2014/050612
§ 371 (c)(1),
(2) Date: Dec. 23, 2015

(87) PCT Pub. No.: WO2014/205578
PCT Pub. Date: Dec. 31, 2014

(65) Prior Publication Data
US 2016/0186563 A1   Jun. 30, 2016

Related U.S. Application Data

(60) Provisional application No. 61/846,933, filed on Jul. 16, 2013, provisional application No. 61/839,274, filed on Jun. 25, 2013.

(51) Int. Cl.
| | | |
|---|---|---|
| *E21D 21/00* | (2006.01) |
| *B23B 41/00* | (2006.01) |
| *B23B 51/00* | (2006.01) |
| *E21D 20/00* | (2006.01) |
| *F16B 13/00* | (2006.01) |

(52) U.S. Cl.
CPC .............. *E21D 21/00* (2013.01); *B23B 41/00* (2013.01); *B23B 51/00* (2013.01); *B23B 51/0027* (2013.01); *B23B 51/0036* (2013.01); *E21D 20/00* (2013.01); *F16B 13/004* (2013.01)

(58) Field of Classification Search
CPC . E21D 21/00; E21D 21/0026; E21D 21/0033; F16B 13/04; F16B 13/06; F16B 13/063; B23B 51/0045
See application file for complete search history.

(56) References Cited

U.S. PATENT DOCUMENTS

| | | | | |
|---|---|---|---|---|
| 4,702,654 A | * | 10/1987 | Frischmann | .......... F16B 13/004 411/31 |
| 5,634,750 A | * | 6/1997 | Frischmann | .......... F16B 1/0071 411/33 |
| 5,730,565 A | | 3/1998 | Hein et al. | |
| 6,135,688 A | | 10/2000 | Belz et al. | |

(Continued)

FOREIGN PATENT DOCUMENTS

| | | | | |
|---|---|---|---|---|
| DE | WO 8204461 A1 | * | 12/1982 | ......... B23B 51/0045 |
| DE | 3139174 A1 | * | 4/1983 | .......... E21D 20/023 |
| EP | 0995913 | | 4/2000 | |

*Primary Examiner* — Frederick L Lagman
(74) *Attorney, Agent, or Firm* — Luedeka Neely Group, PC

(57) ABSTRACT

The self-undercut anchor with carbide tip is designed to create a drill hole and enlarging the lowermost end of said drill hole by means of a carbide tip or cutting portion. The carbide tip or cutting portion is positioned in such a way so as to not obstruct the setting of the anchor by means of the spreading lamellae. Once said lamellae have been positioned properly and forced downward, the self-undercut anchor is set in place.

18 Claims, 23 Drawing Sheets

(56) References Cited

U.S. PATENT DOCUMENTS

| | | | |
|---|---|---|---|
| 7,004,686 B2 | 2/2006 | Mocivnik et al. | |
| 9,296,050 B2 * | 3/2016 | Cousineau | B23B 51/0045 |
| 2008/0038068 A1 * | 2/2008 | Craig | E21D 21/0046 |
| | | | 405/259.3 |
| 2008/0179105 A1 | 7/2008 | Duncan | |
| 2008/0310930 A1 * | 12/2008 | Schaeffer | B23B 37/00 |
| | | | 411/55 |
| 2009/0123251 A1 | 5/2009 | Dubon | |
| 2009/0139772 A1 * | 6/2009 | Miyanaga | B23B 51/0045 |
| | | | 175/265 |
| 2010/0003101 A1 | 1/2010 | Ricketts | |
| 2010/0098500 A1 * | 4/2010 | Weaver | E21D 21/0026 |
| | | | 405/259.1 |
| 2015/0167715 A1 * | 6/2015 | Hakenholt | F16B 13/065 |
| | | | 166/381 |

\* cited by examiner

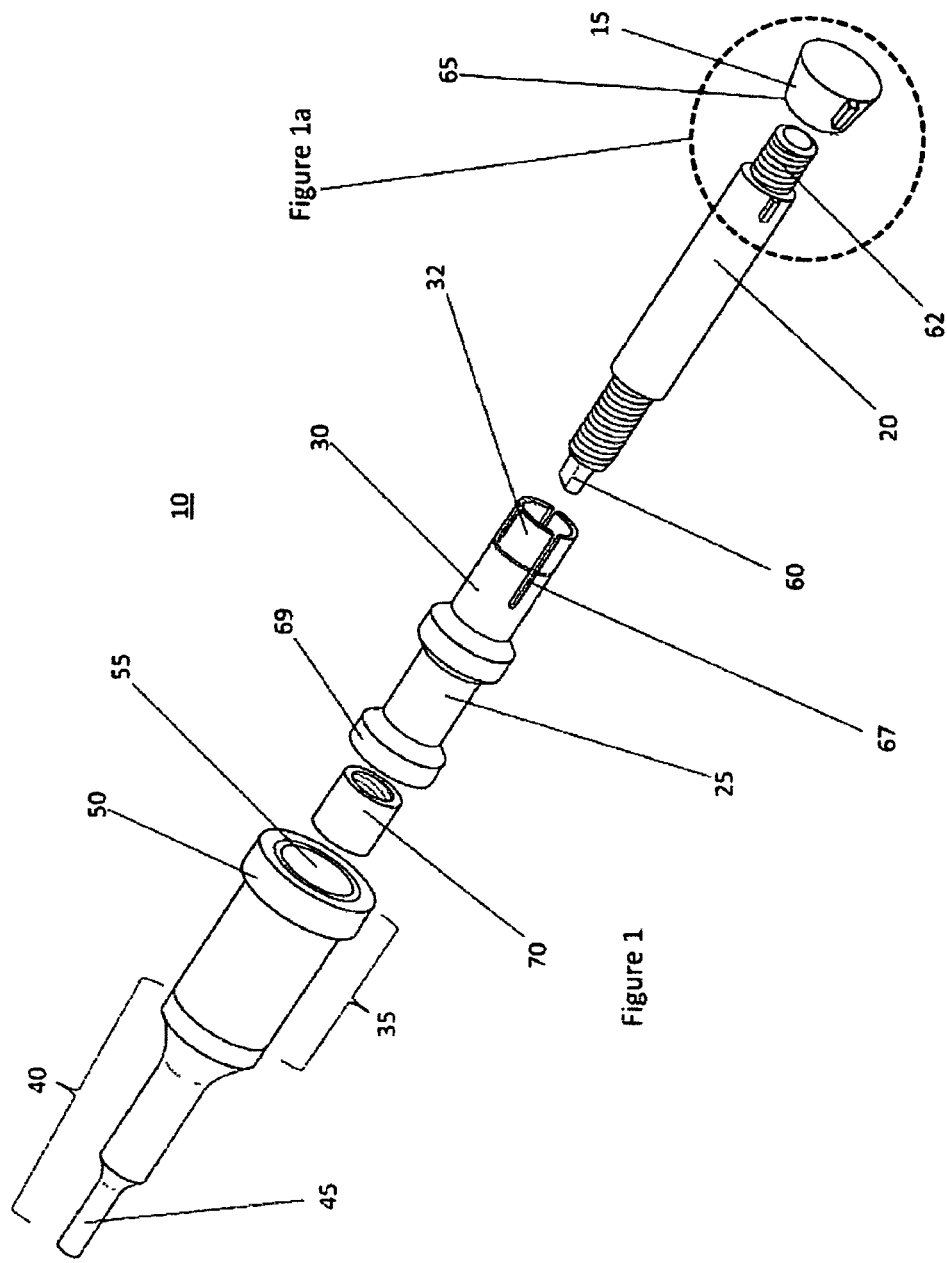

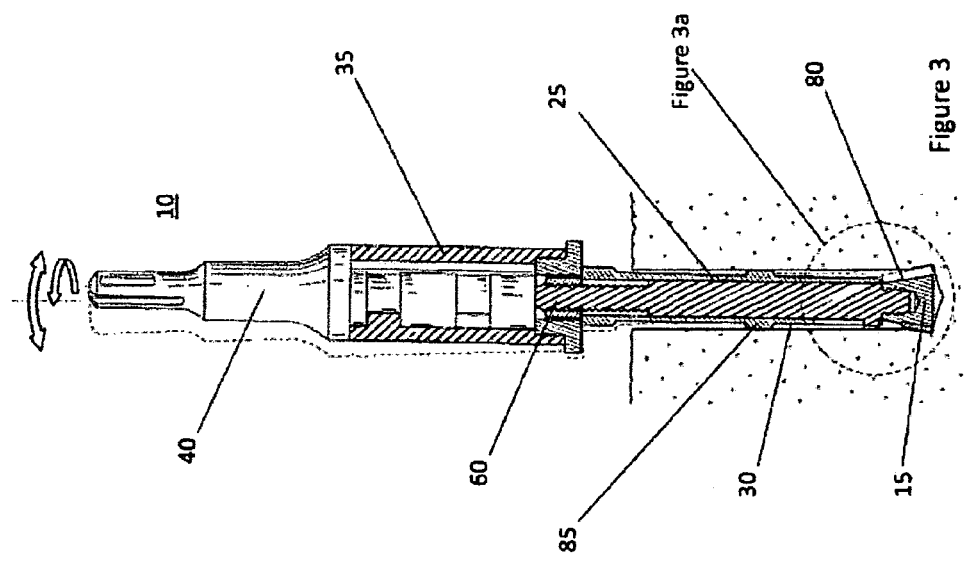
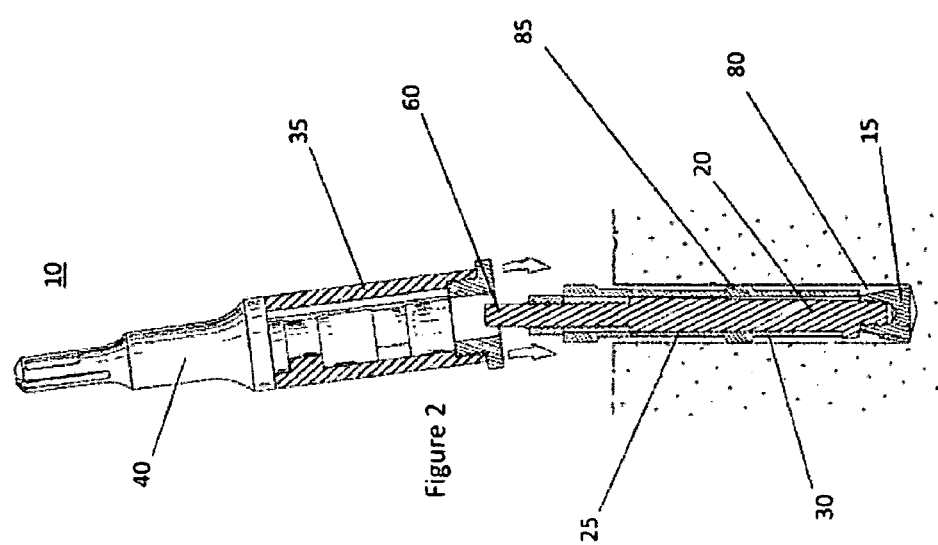

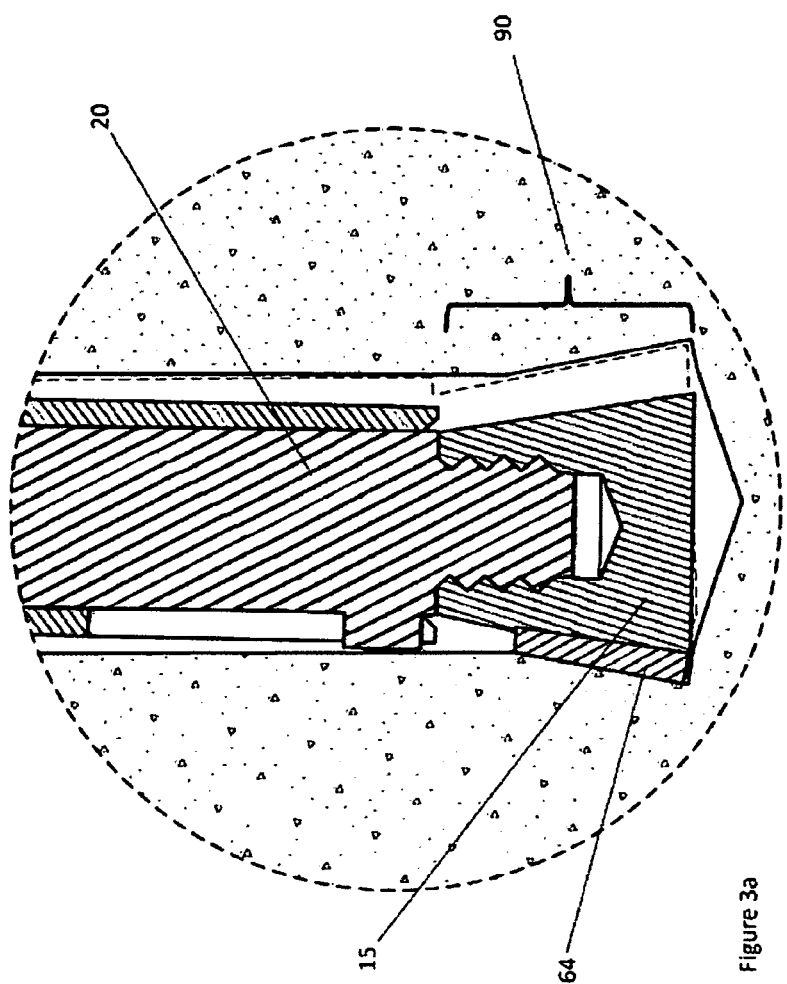

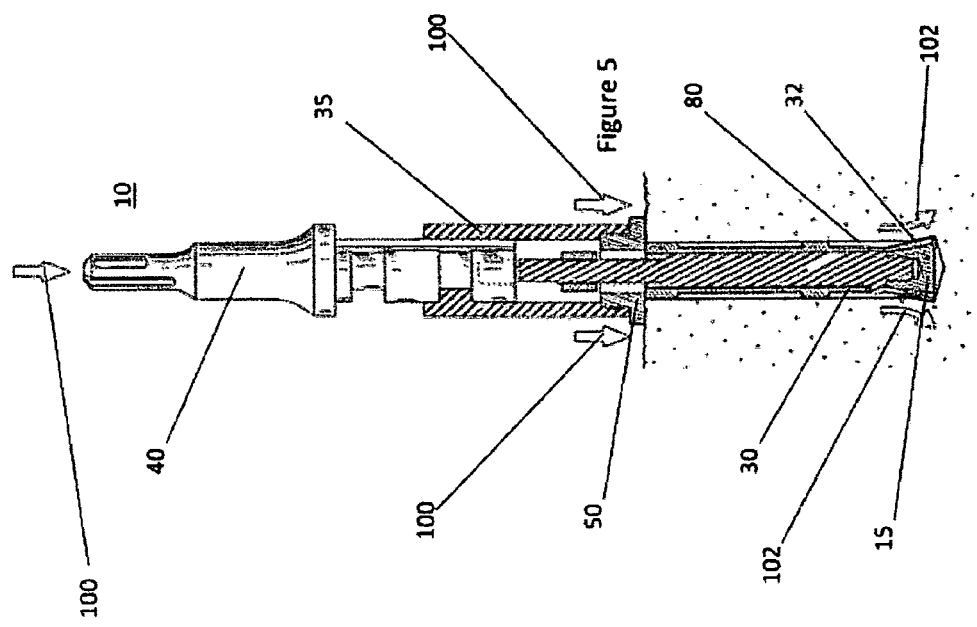
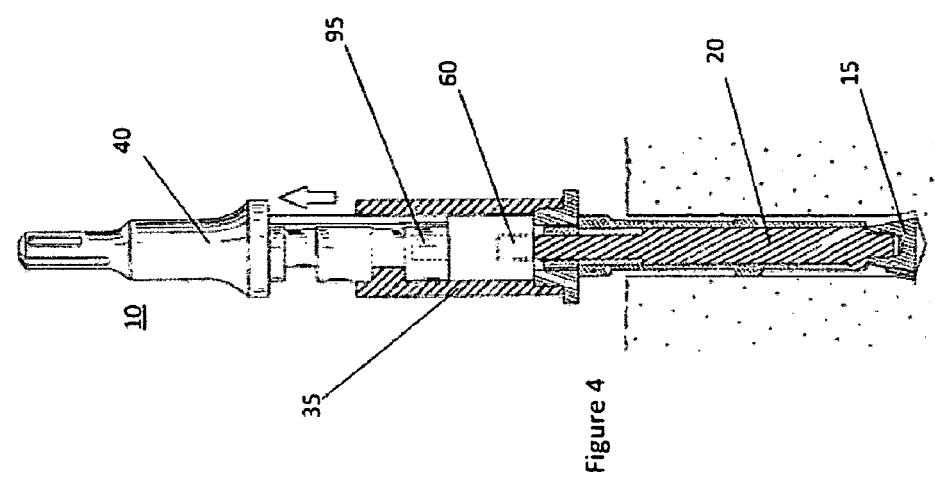

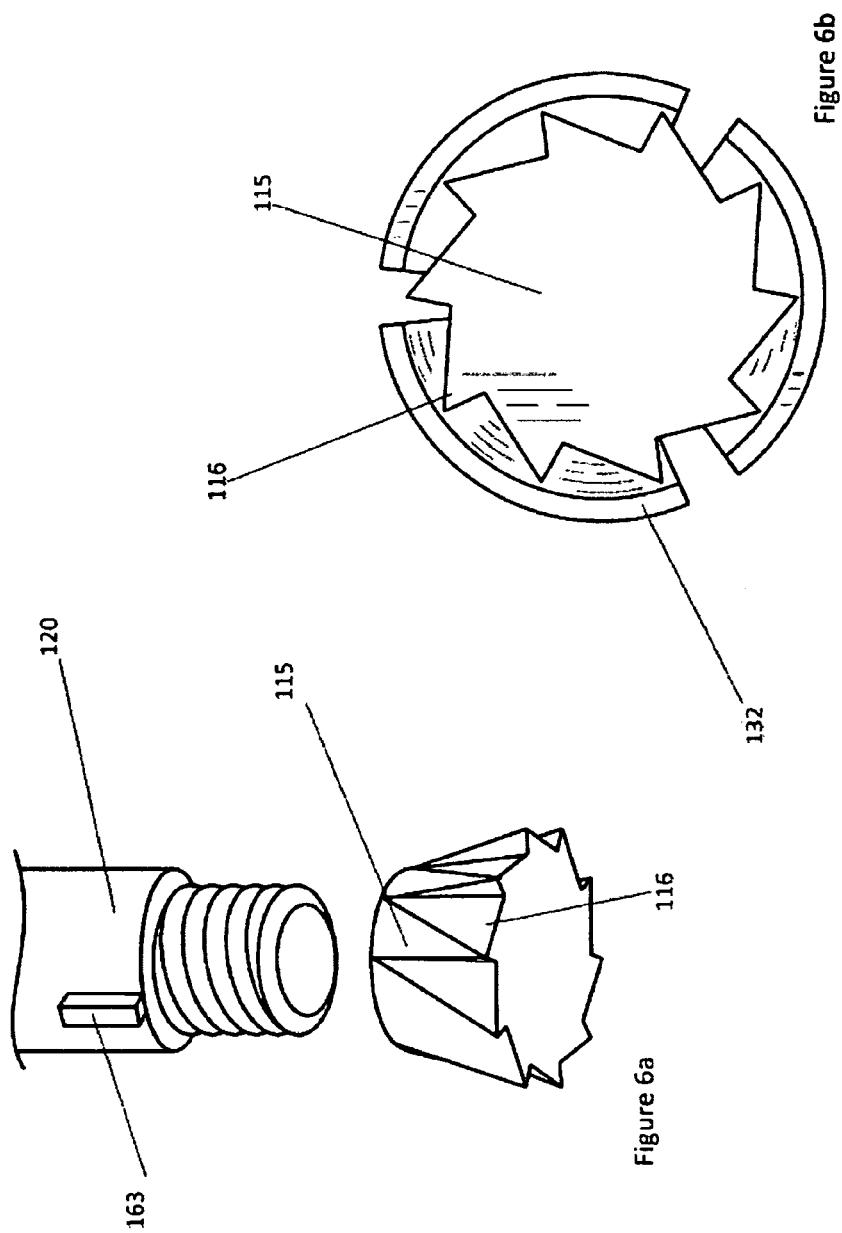

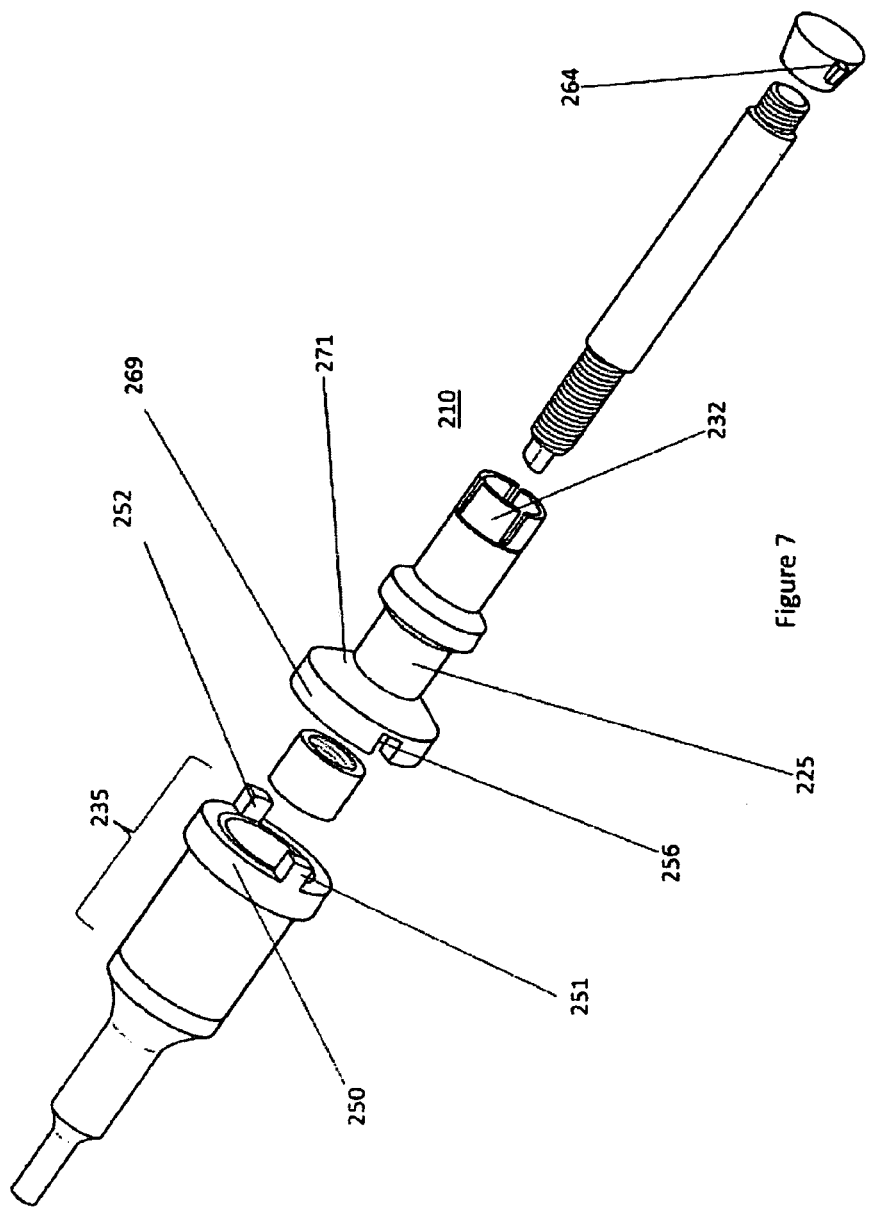

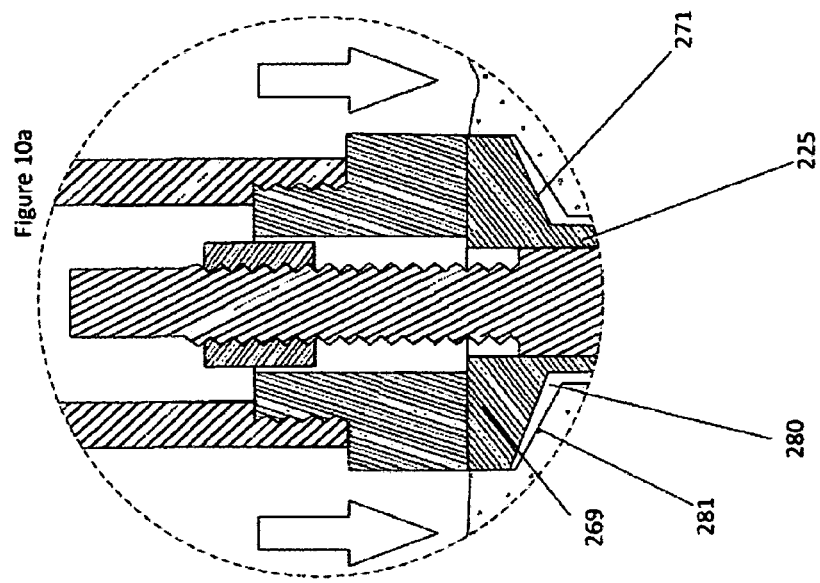
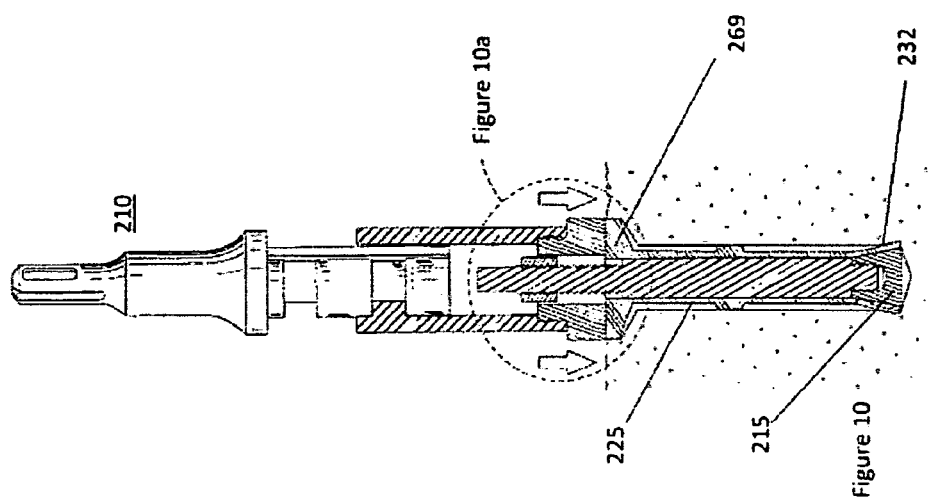

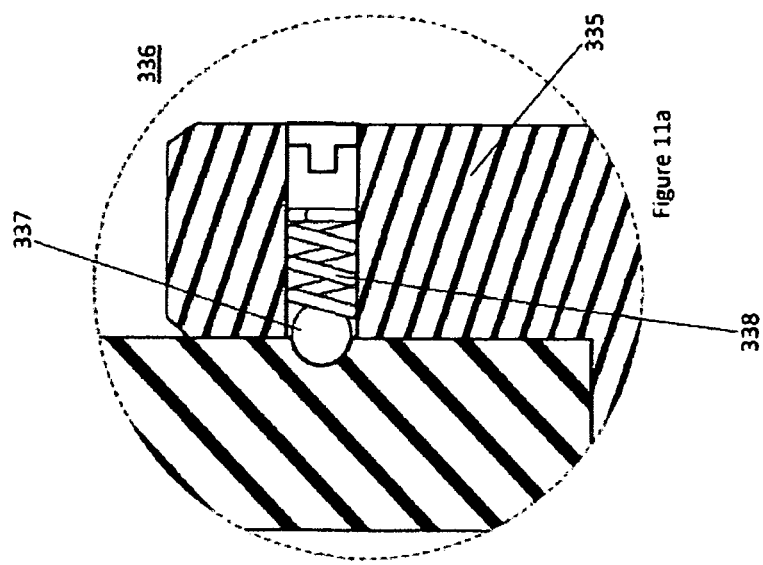
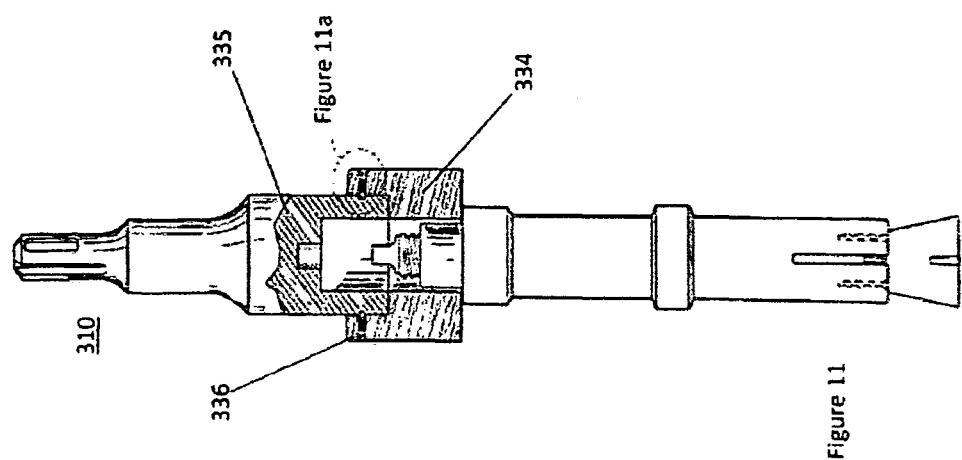

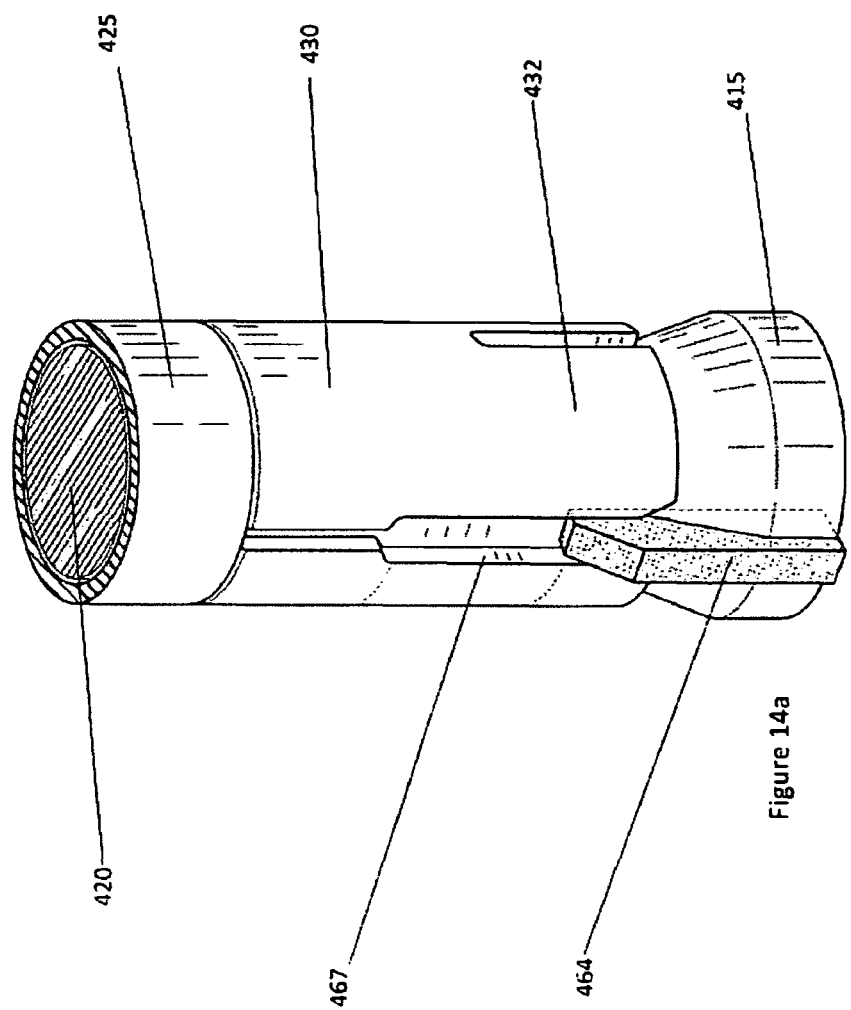

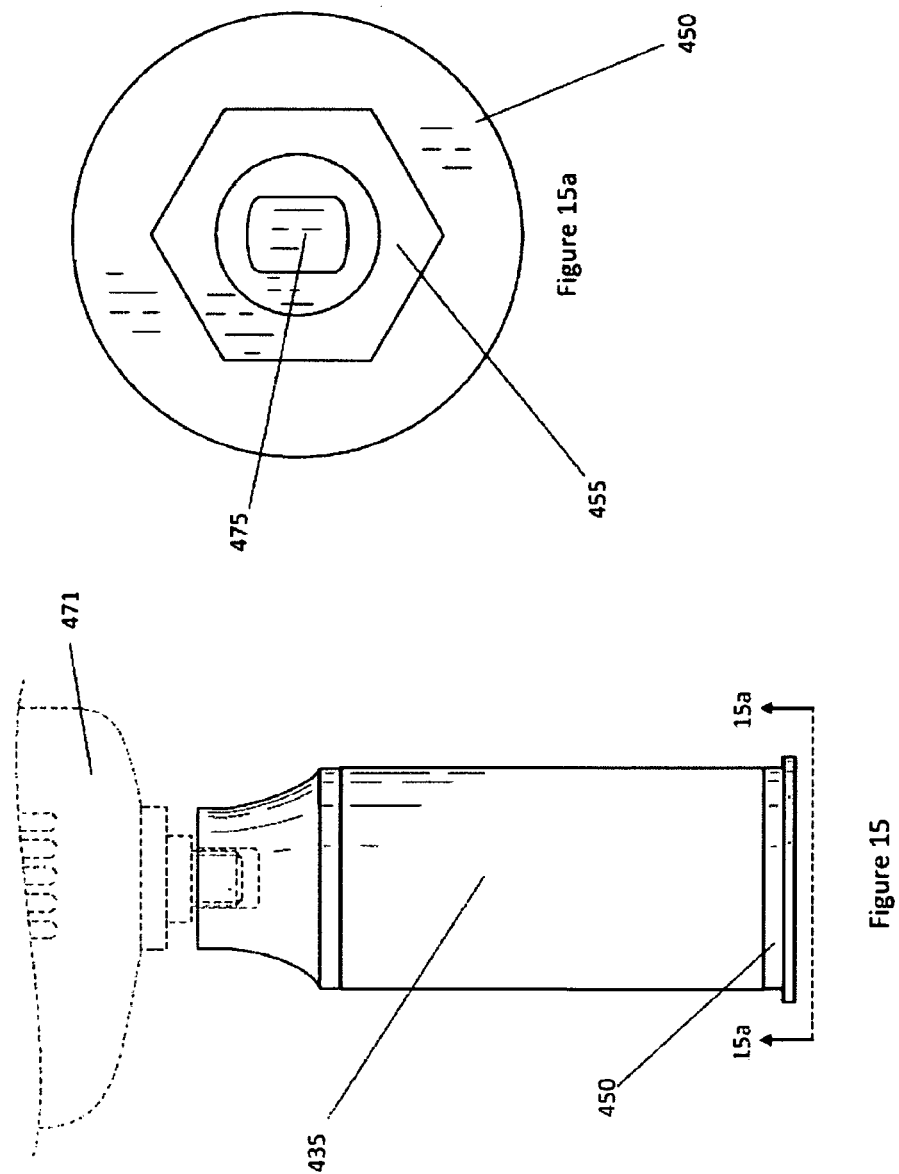

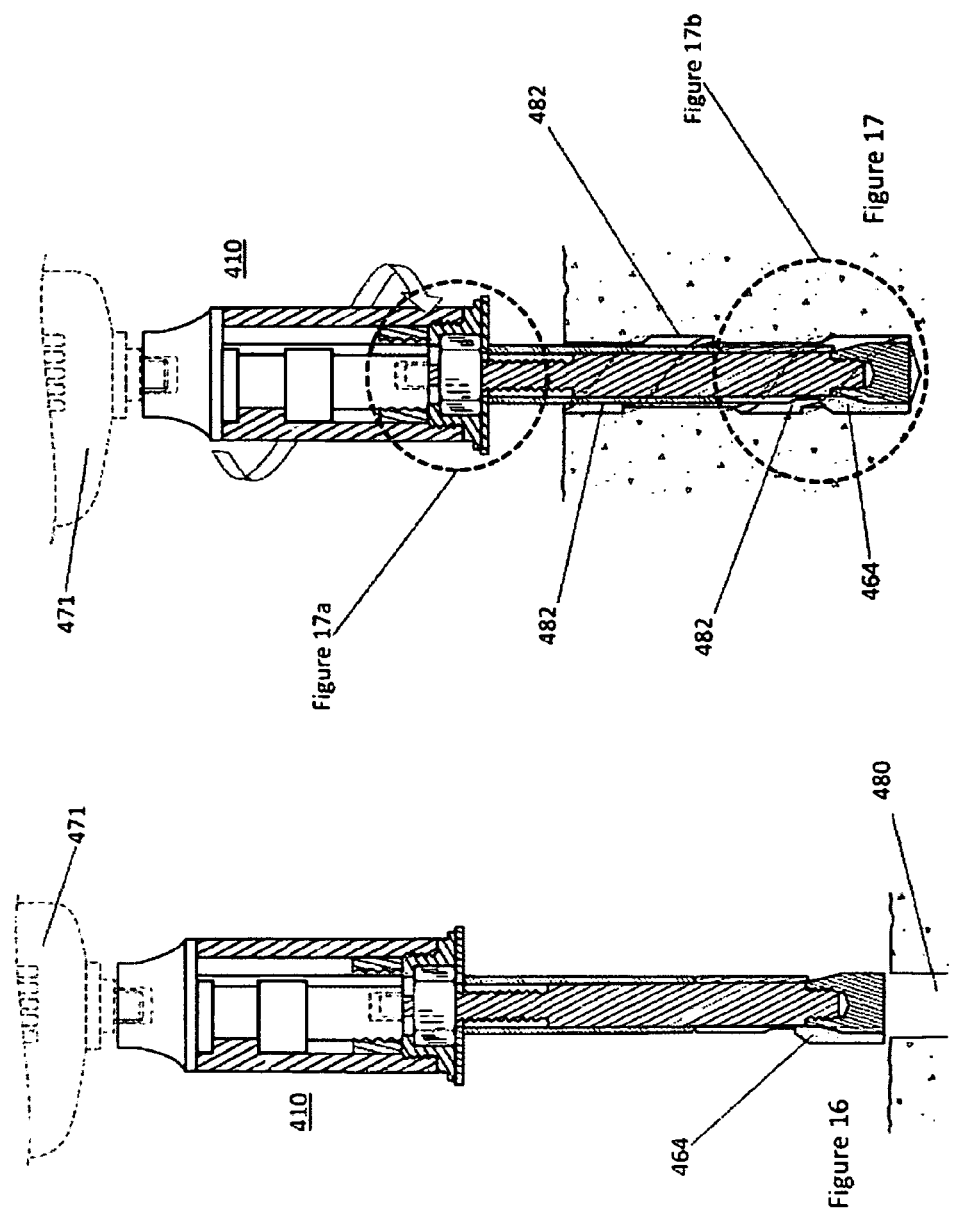

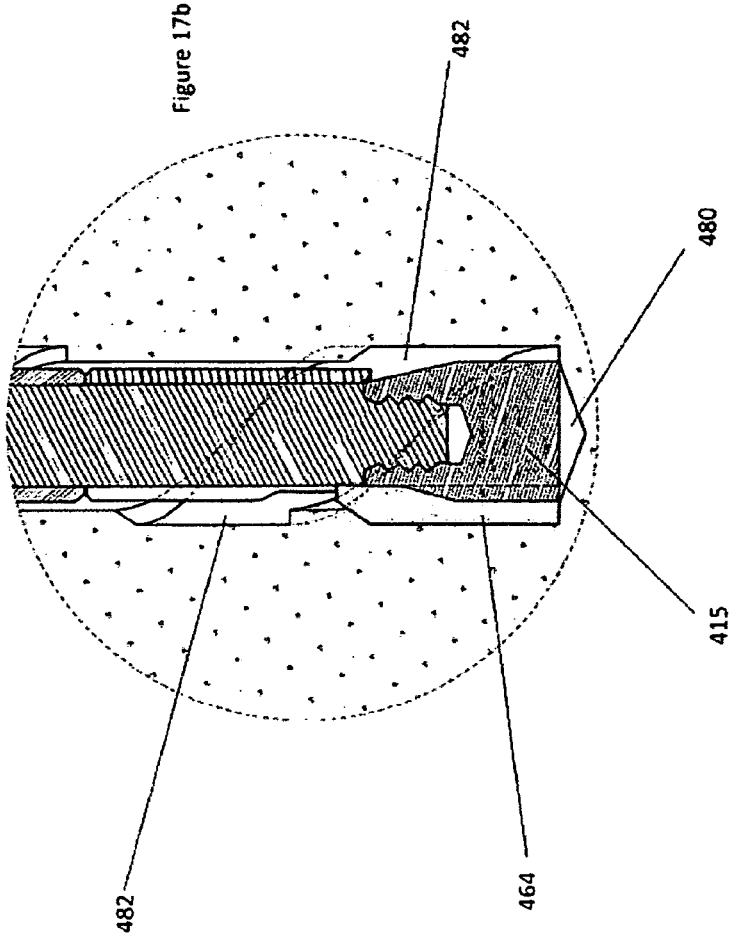

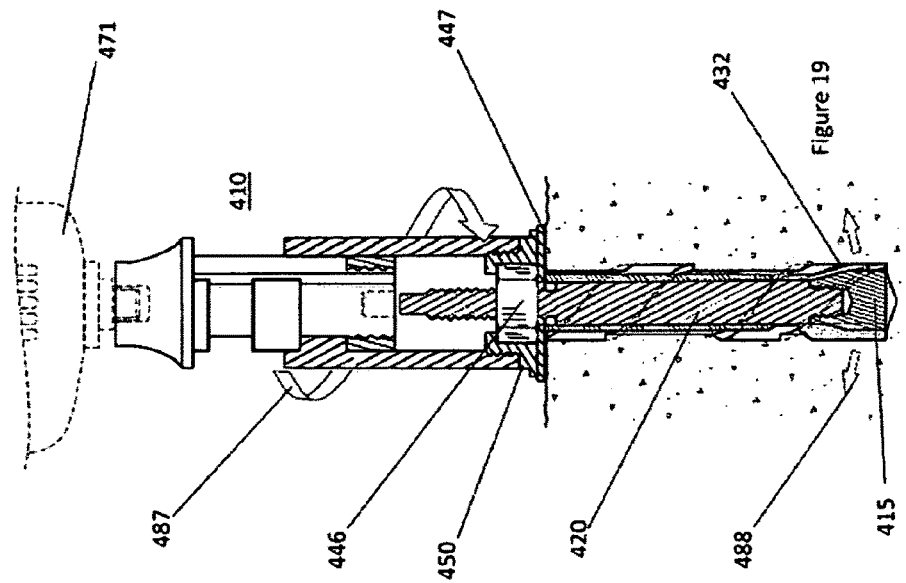
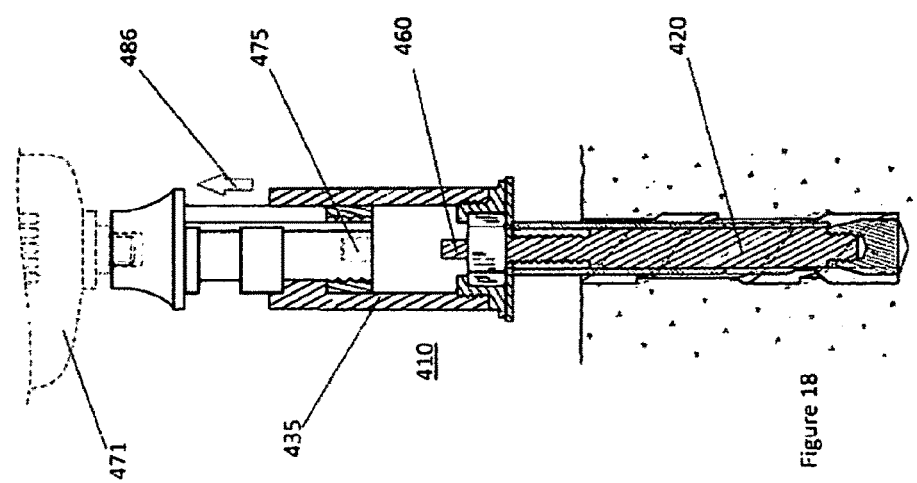

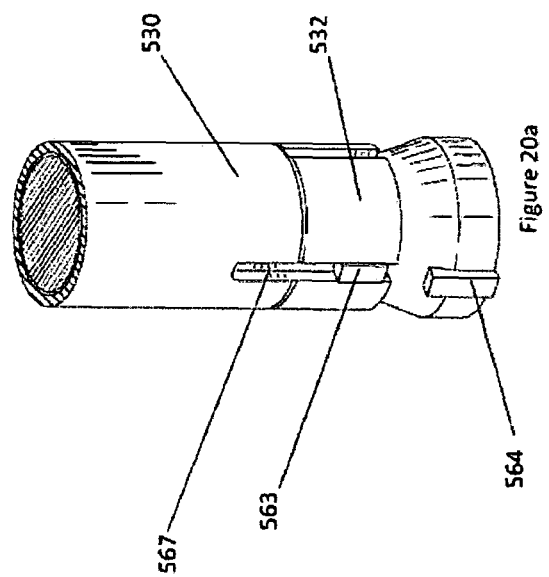
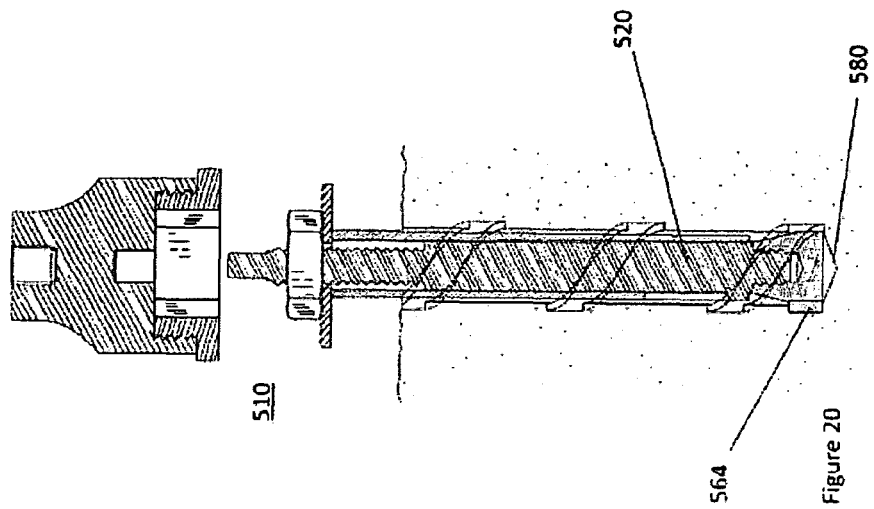

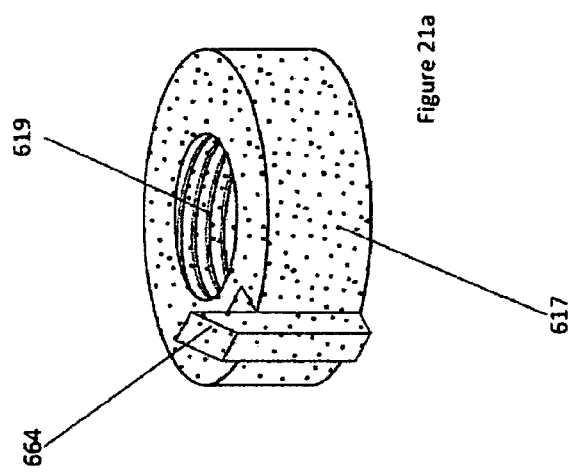
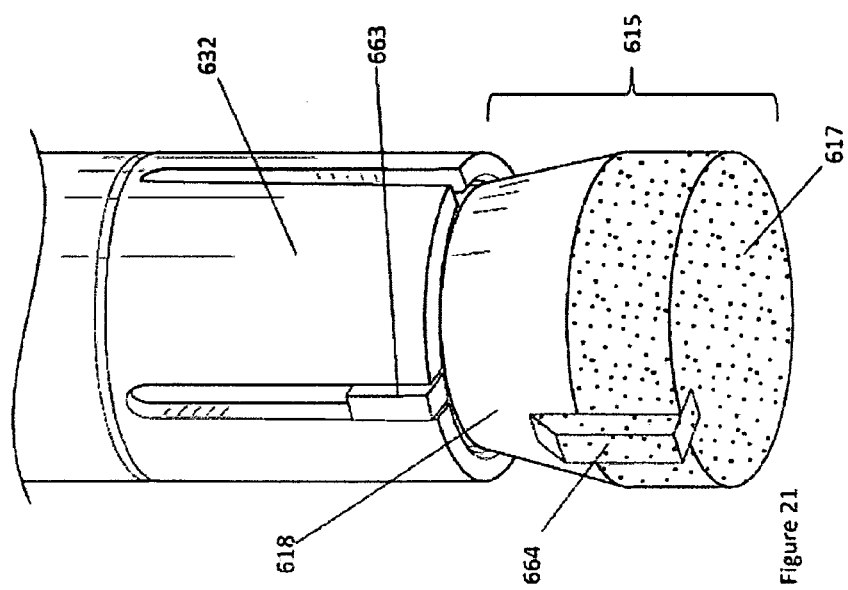

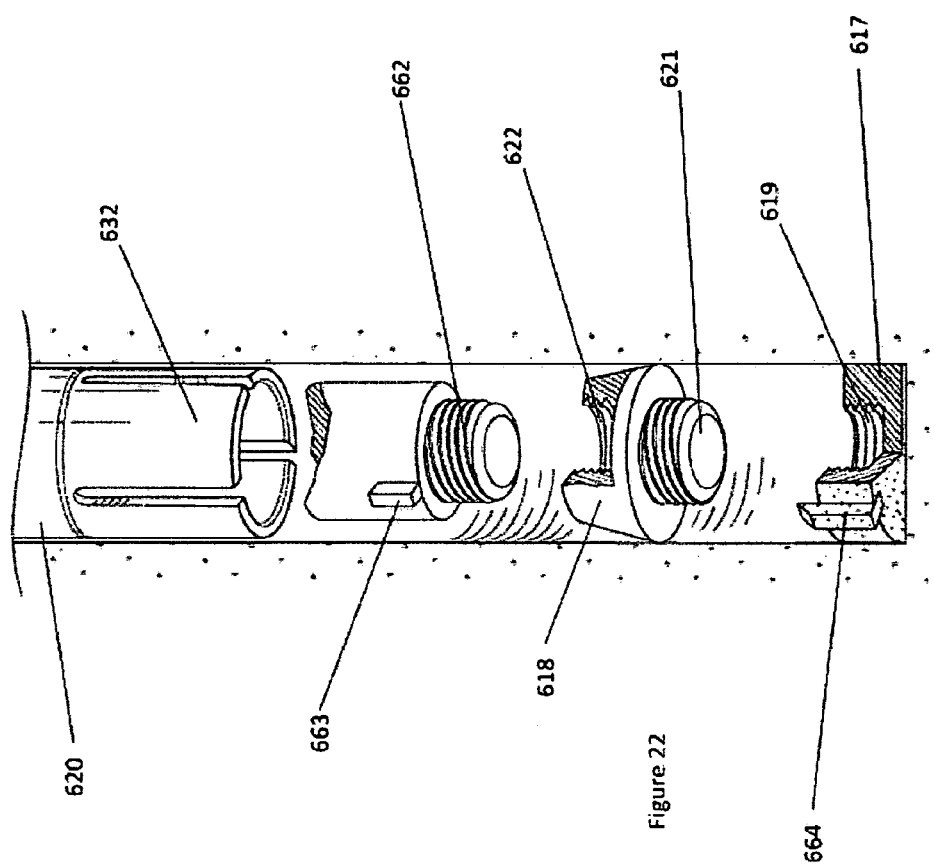

SELF-UNDERCUT ANCHOR SYSTEM

FIELD OF THE INVENTION

The invention relates to anchors and, more specifically, to a self-undercut anchor system with either a carbide bit or cutting portions.

BACKGROUND

Anchors are conventionally used in construction to attach various components of a building construction to an overhead ceiling or other structure. Such components to be attached can relate to, for example, services that provide plumbing, electrical, drainage, sprinkler system piping and drop ceilings. From these anchors, which are usually of the sleeve type or wedge type variety, all of the above services and ceilings are suspended or secured.

Conventionally, in setting anchors in concrete to suspend an awning, for example, a hole is pre-drilled in the surface to which the anchor is to be applied, and then the anchor is inserted into the pre-drilled hole. However, when setting such anchors in concrete it is not uncommon for such anchors to weaken and loosen over time, particularly in situations where cracking or chipping of the concrete around the pre-drilled hole has occurred.

Furthermore, studies have revealed that cracking can typically occur in the concrete element, and that such cracks can significantly impact the performance of anchors. Cracks can originate on a concrete beam or slab in a variety of ways, such as creep, temperature settlement of the support or foundation, thermal expansion and contraction stress overload, or from a natural disaster such as an earthquake or flood. In such situations, the situation can arise where, if one such concrete anchor fails and lets go, the remaining anchors, by virtue of the weight they additionally assume in light of such failure, can also similarly collapse and fail.

It has been found that enlarging the lower (interior) part of the pre-drilled hole can allow for the use of anchors in a more secure manner. It has further been found that providing a pre-drilled hole with an enlarged, conical lower end can be advantageously provided by a self-undercut anchor having an enlarged cutting portion adjacent the tip, which is inserted into the pre-drilled hole, whereby the enlargement of the cutting portion is configured so that it can pass through the shaft of the pre-drilled hole to the upper end to be enlarged.

It would therefore be advantageous to have an improved self-undercut expansion anchor system meant for use in a pre-drilled hole for the insertion and setting of anchors into brittle materials such as concrete, stone, masonry and cementuous materials.

It would be further advantageous to have an improved self-undercut expansion anchor system for use in creating a drill hole and, at the same time, enlarging a lowermost end of a drill hole, wherein an anchor can later be positioned and securely retained within the enlarged area.

It would also be further advantageous to have an improved self-undercut expansion anchor system meant to be used for the later insertion and setting of anchors which utilizes interlocked components which can be used as a setting tool in a one-step process to position a bore hole sleeve and an anchor in position within the bore hole. To this end, the present invention effectively addresses this need.

SUMMARY OF THE INVENTION

The present invention provides a self-undercut expansion anchor for enlarging a lowermost end of a bore hole, the self-undercut anchor comprising a drill connector portion operatively connected to a drill; a setting tool connected to the drill connector portion, said setting tool having a lower setting tool portion comprised of a central opening on an underside thereof; a threaded drill rod sized to fit into the bore hole, said threaded drill rod further comprising an upper end, inserted into the central opening of the lower setting tool portion and engaged with the setting tool; and, a lower end; a bore hole sleeve positioned on the threaded drill rod to be slid into the bore hole; an anchor positioned on the threaded drill rod and connected to the bore hole sleeve to be slid into the bore hole; and a cutting tip portion connected to the lower end of the threaded drill rod and engaged with the anchor for enlarging a lowermost end of the bore hole.

BRIEF DESCRIPTION OF THE DRAWINGS

The following figures serve to illustrate various embodiments of features of the invention. These figures are illustrative and are not intended to be limiting.

FIG. 1 is an exploded perspective view illustrative of a first embodiment of a self-undercut anchor as described in the present invention;

FIG. 2 is a cross-sectional front view of the setting tool and drill connector portion being inserted onto the threaded drill rod according to a first embodiment of a self-undercut anchor as described in the present invention;

FIG. 3 is a cross-sectional front view of the self-undercut anchor being rotated and pivoted to create the undercut according to a first embodiment of the present invention;

FIG. 3a is a detailed cross-sectional front view of the cutting tip portion and threaded drill rod being rotated and pivoted to enlarge a lowermost end of a bore hole according to a first embodiment of the present invention;

FIG. 4 is a cross-sectional front view of the movement of the setting tool which disengages the setting tool from the threaded drill rod according to a first embodiment of a self-undercut anchor as described in the present invention;

FIG. 5 is a cross-sectional front view of the self-undercut anchor being set according to a first embodiment of the present invention;

FIG. 6a is a detailed perspective view of a cutting tip portion and a threaded drill rod of a self-undercut anchor according to a second embodiment of the present invention;

FIG. 6b is a bottom view of the lamellae spread over the cutting portions of a self-undercut anchor according to a second embodiment of the present invention;

FIG. 7 is an exploded perspective view illustrative of a third embodiment of a self-undercut anchor as described in the present invention;

FIG. 10 is a cross-sectional view of the setting of the self-undercut anchor according to a third embodiment of the present invention;

FIG. 10a is a detailed cross-sectional view of the upper extremity of the bore hole sleeve being anchored into place according to a third embodiment of a self-undercut anchor as described in the present invention;

FIG. 11 is a semi cross-sectional view of a semi-cylindrical shaft engaged with the setting tool of the self-undercut anchor according to a fourth embodiment of the present invention;

FIG. 11a is a detailed cross-sectional view of the ball bearing within a cylindrical shaft according to a fourth embodiment of a self-undercut anchor as described in the present invention;

FIG. 14a is a detailed perspective view of the alignment between a carbide tip and an open-ended slit of spreading lamellae according to a fifth embodiment of a self-undercut impact anchor as described in the present invention;

FIG. 15 is a detailed front view of the setting tool according to a fifth embodiment of a self-undercut impact anchor as described in the present invention;

FIG. 15a is a planar underside view of the setting tool according to a fifth embodiment of a self-undercut impact anchor as described in the present invention;

FIG. 16 is a cross-sectional front view of the self-undercut impact anchor being inserted into a bore hole according to a fifth embodiment of the present invention;

FIG. 17 is a cross-sectional front view of the self-undercut impact anchor having just been impacted into a bore hole according to a fifth embodiment of the present invention;

FIG. 17b is a detailed cross-sectional front view of a cutting tip portion and carbide bit completed inserted within a bore hole according to a fifth embodiment of a self-undercut impact anchor as described in the present invention;

FIG. 18 is a cross-sectional front view of the upward movement of the setting tool to an unlocked, disengaged position according to a fifth embodiment of a self-undercut impact anchor as described in the present invention;

FIG. 19 is a cross-sectional front view of the self-undercut impact anchor being set according to a fifth embodiment of the present invention;

FIG. 20 is a cross-sectional front view of the self-undercut impact anchor according to a sixth embodiment of the present invention;

FIG. 20a is a detailed perspective view of the alignment between a carbide tip and a key according to a sixth embodiment of a self-undercut impact anchor as described in the present invention;

FIG. 21 is a detailed perspective view of the assembled cutting tip portion according to a seventh embodiment of the self-undercut anchor as described in the present invention;

FIG. 21a is a detailed perspective view of a lower removable cutting tip portion according to a seventh embodiment of the self-undercut anchor as described in the present invention; and FIG. 22 is a detailed exploded view of the assembly of the upper and lower removable cutting tip portions onto the lower end of the threaded drill rod according to a seventh embodiment of the self-undercut anchor as described in the present invention.

DETAILED DESCRIPTION

The following embodiments are merely illustrative and are not intended to be limiting. It will be appreciated that various modifications and/or alterations to the embodiments described herein may be made without departing from the invention and any modifications and/or alterations are within the scope of the contemplated invention.

While the following description makes reference to the use of an impact drill, or just a broad drill in general, this wording should not be construed as a limitation. Indeed, any type of power tool should be used interchangeably in the wording of this description, such that either an impact drill, hammer drill, or any other type of drill as known in the art would be able to create the undercut as described herein. The novelty of the invention does not lie in the use of a specific power tool and the connection thereto, but rather to the other parts creating the undercut in the bore hole.

Figure 1A:
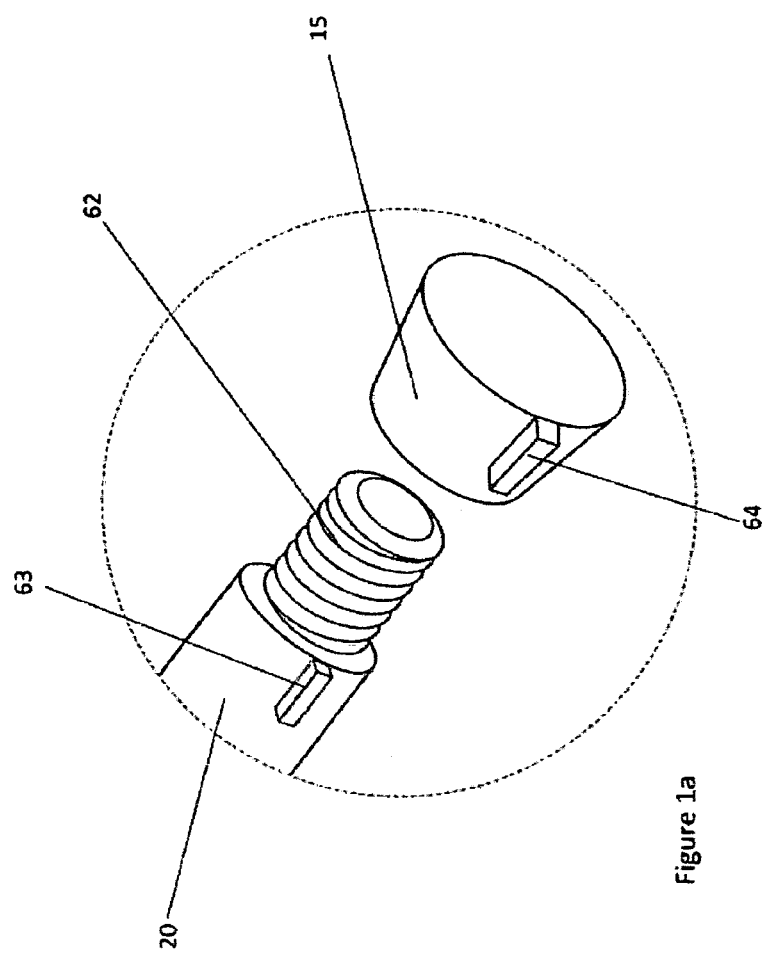
FIG. 1a is a detailed perspective view of the alignment between a carbide tip and a key of a first embodiment of a self-undercut anchor as described in the present invention.

With reference to FIGS. 1 and 1a and according to one embodiment of the present invention, a self-undercut anchor 10 is preferably comprised of a cutting tip portion 15, a threaded drill rod 20, a bore hole sleeve 25 connected to an anchor 30 with spreading lamellae 32, a setting tool 35 and a drill connector portion 40. The self-undercut anchor 10 is for use in the later insertion and setting of anchors into concrete, stone, masonry and cementuous materials. A proximal upper end 45 of the drill connector portion 40 is constructed and arranged to be releasably secured to a drill (not shown) by way of a drill spindle (not shown). Preferably, the drill connector portion 40 will be made of a durable, machinable metal. The drill connector portion 40 and setting tool 35 are machined as one complete piece; however, a worker skilled in the relevant art would appreciate that they can be two separate pieces in another embodiment. A lower setting tool portion 50 of the setting tool 35 defines a substantially central opening 55 which receives an upper end 60 of the threaded drill rod 20. A connecting aperture (not shown) of the central opening 55 is shaped in such a way so as to lock into place the specific semi-circular shape of the upper end 60 of the threaded drill rod 20. A worker skilled in the art would appreciate that while this specific shape is semi-circular in nature, any other type of lockable shape would work providing that it can lock into a matching shape in the central opening 55 of the lower setting tool portion 50. Meanwhile, the lower end 62 of the threaded drill rod 20 receives the cutting tip portion 15, which is threaded thereon, the cutting tip portion 15 having an internally threaded opening (not shown) on an upper surface thereof for threaded engagement with the threaded drill rod 20. The threaded drill rod 20 is further comprised of a key 63, which is meant to line up with a carbide bit 64 soldered, brazed or machined onto the cutting tip portion 15 of the self-undercut anchor 10 when the cutting tip portion 15 is fully threaded onto the lower end 62 of the threaded drill rod 20. A worker skilled in the relevant would appreciate that said key is machined onto the threaded drill rod 20 but could be attached in a number of other ways as known in the art. A worker skilled in the relevant art would further appreciate that despite the fact that only one carbide bit is shown, two or more carbide bits could also be present at opposing ends of the cutting tip portion without departing from the scope of the invention. A worker skilled in the relevant art would also appreciate another obvious embodiment, whereby the carbide would extend longitudinally along the length of the cutting tip portion, from the lower end of said cutting tip portion to between two lamellae. As such, the carbide would serve as both the guide for the lamellae and create the undercut in the concrete.

With further reference to FIGS. 1 and 1a, when in use, the anchor 30 and bore hole sleeve 25 are positioned on the threaded drill rod 20, where the spreading lamellae 32 of the anchor 30 sit on an upper edge 65 of the cutting tip portion 15. An open-ended slit 67 located on the anchor 30 between two adjacent lamellae 32 is designed to receive the key 63 of the threaded drill rod 20. The alignment of said key 63 with the carbide bit 64 is important as it specifically positions the lamellae 32 around the carbide bit 64 such that the lamellae 32 cannot spread over and cover said carbide bit 64 when setting the self-undercut anchor 10, as is further explained below. Said key 63 is positioned between two adjacent spreading lamellae 32 and aligned with the carbide bit 64 of the cutting tip portion 15. While the slit 67 is positioned on the anchor 30 between two adjacent lamellae 32, a worker skilled in the relevant art would appreciate that said slit 67 could also be positioned on the upper extremity 69 of the bore hole sleeve 25, provided that the corresponding key 63 is similarly located near the upper end 60 of the threaded drill rod 20. To function, the bore hole sleeve 25 and anchor 30 would need to be inserted over the threaded drill rod 20 from the lower end of said threaded drill rod 20, by first removing the cutting tip portion 15. The alternate positioning of the key 63 and slit 67 would still combine to align the lamellae 32 such that said lamellae 32 do not spread over or cover the carbide bit 64 of the cutting tip portion 15. Once the anchor 30 and bore hole sleeve 25 are positioned on the threaded drill rod 20, a protective sleeve 70 is positioned over the upper end 60 of the threaded drill rod 20 as a means to protect said threaded drill rod 20 when tilting the anchor 30 with the setting tool 35 to create the undercut (as will be further described below). The upper end 60 of the threaded drill rod 20 is secured within the opening 55 of the lower setting tool portion 50. While the cutting tip portion 15 in this particular embodiment is conical in shape, a worker skilled in the relevant art would appreciate that said cutting tip portion 15 could be of various other shapes and sizes, including a bell shape, provided that the carbide bit 64 is located on the widest edge of said shape in order to properly create the undercut, and that said carbide bit 64 is able to line up with the key 63.

With reference to FIGS. 2, 3 and 3a a bore hole 80 is shown and the self-undercut anchor 10 has been inserted in said bore hole 80. The threaded drill rod 20, cutting tip portion 15, anchor 30 and bore hole sleeve 25 have been inserted within said bore hole 80.

With specific reference to FIG. 2, the drill connector portion 40 and setting tool 35 are being connected onto the upper end 60 of the threaded drill rod 20 as was described above.

With specific reference to FIG. 3, once connected, drilling ensues and the self-undercut anchor 10 is rotated and moved about, such as demonstrated by the arrows. An abutment portion 85 is shown positioned between the anchor 30 and the bore hole sleeve 25, and said abutment portion 85 has a width greater than that of the remainder of said bore hole sleeve 25. As such, the abutment portion 85 protrudes cylindrically and is flush and abuts the inner walls of the bore hole 80, creating a gap between the remainder of the bore hole 80 and both the anchor 30 and bore hole sleeve 25. The engagement between the inner wall of the bore hole 80 and the abutment portion 85 creates an anchoring point whereby the remainder of the self-undercut anchor 10 can pivot, as is shown by means of the dotted lines, in order to create the undercut (as shown in FIG. 3).

With specific reference to FIG. 3a, an undercut 90 is shown having been created by the rotation of the carbide bit 64 of the cutting tip portion 15 and the pivoting of the self-undercut anchor (not shown) as explained above. The threaded connection between the lower end 62 of the threaded drill rod 20 and the cutting tip portion 15 is also shown in greater detail, but a worker skilled in the relevant art would appreciate that said threaded drill rod 20 could be machined as an integral, one-piece unit onto the cutting tip portion 15 instead of threaded thereon.

With reference to FIG. 4 and according to one embodiment of the present invention, an arrow represents the movement of the setting tool 35 and drill connector portion 40, disconnecting the upper end 60 of the threaded drill rod 20 from the connecting aperture 95 located within the setting tool 35. This allows for the movement of the setting tool 35 and drill connector portion 40 to be independent from the threaded drill rod 20 and cutting tip portion 15.

Figure 5A:
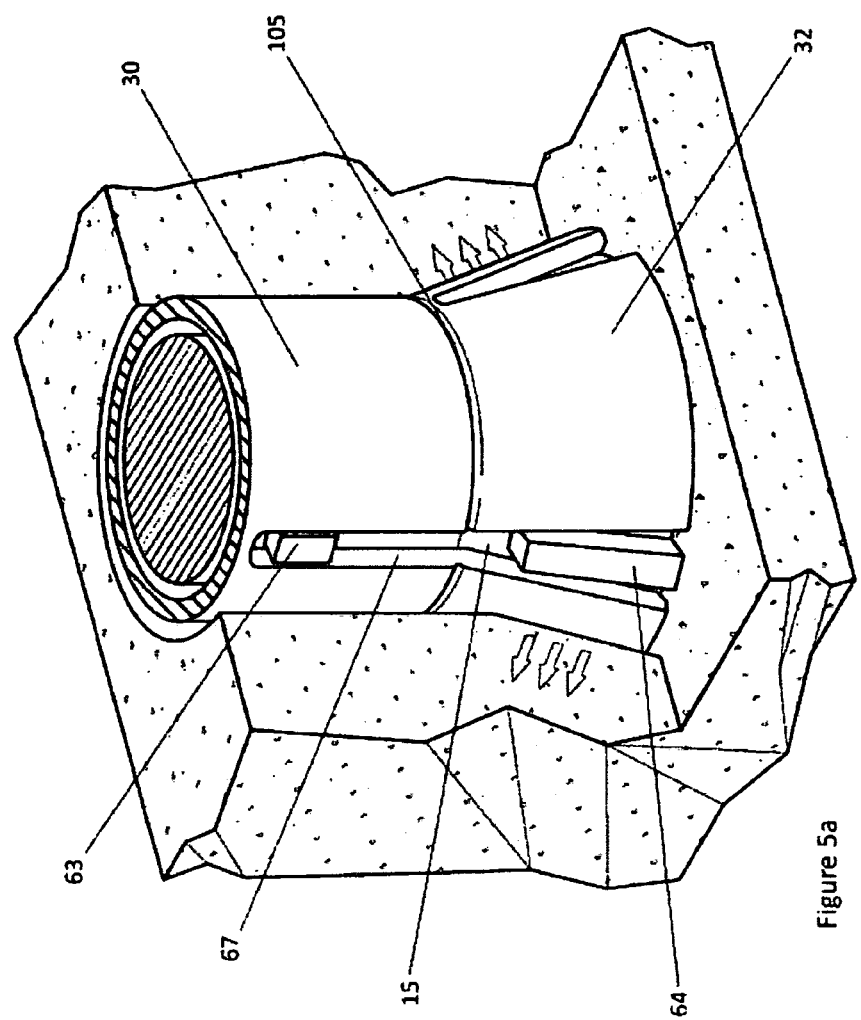
FIG. 5a is a detailed perspective view of the lamellae spread around the carbide bit when the self-undercut anchor is set, according to a first embodiment of the present invention.

With reference to FIGS. 5 and 5a and according to one embodiment of the present invention, the drill connector portion 40 and setting tool 35, being independent from the threaded drill rod 20 and cutting tip portion 15, are forced downwards, as represented by upper arrows 100. The self-undercut anchor 10 is set once the lower setting tool portion 50 is flush against the concrete, as said lower setting tool portion 50 has a diameter than that of the bore hole 80 and threaded drill rod 20. At this point, the lamellae 32 have extended outwards corresponding to the conic shape of the cutting tip portion 15, as described by lower arrows 102.

With specific reference to FIG. 5a and according to one embodiment of the present invention, the lamellae 32 have been forced downward over the cutting tip portion 15 by virtue of an annular recessed area 105 positioned above the lamellae 32. The presence of the annular recess area 105 allows for greater outward expansion range of the spreading lamellae 32 when the spreading lamellae 32 are forced outwardly. The slit 67 located between two adjacent lamellae 32 and extending onto the lower end of the anchor 30 guides said anchor 30 downward along the key 63. The key 63 is aligned with the carbide bit 64 such that the function of the key 63 is to guide the lamellae 32 over the cutting tip portion 15 without spreading and covering the carbide bit 64.

Figure 6:
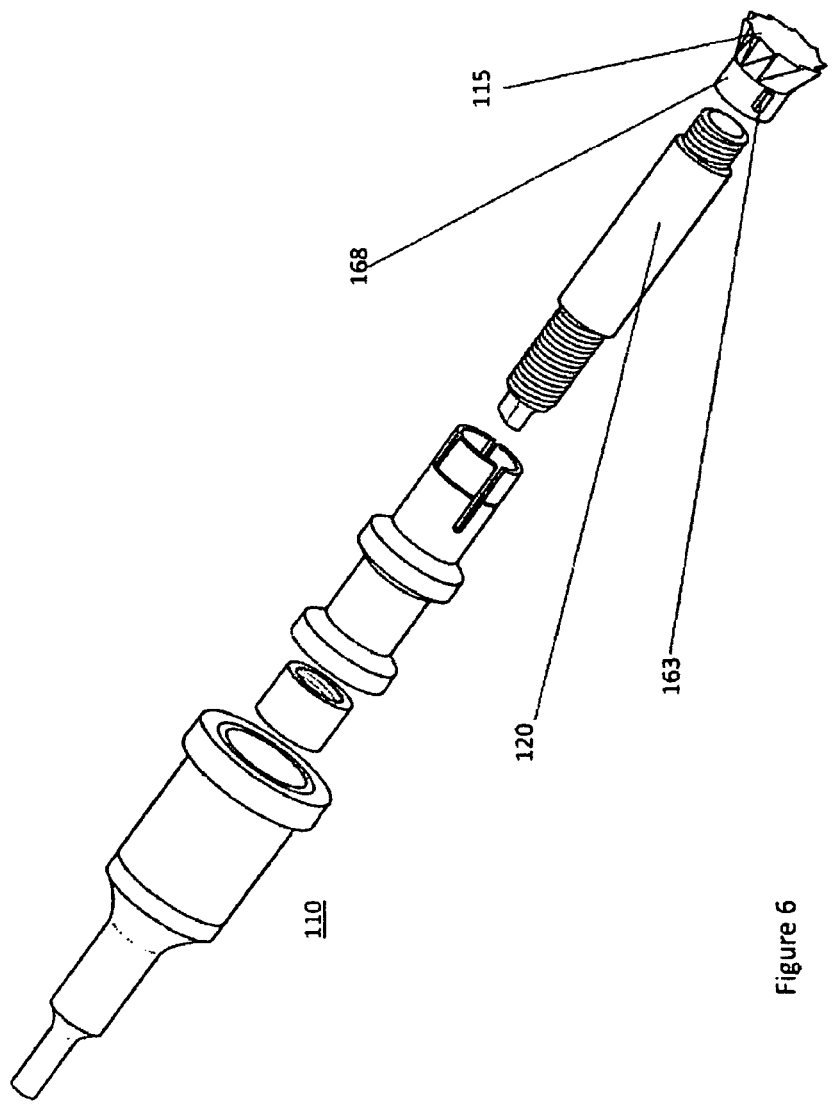
FIG. 6 is an exploded perspective view illustrative of a second embodiment of a self-undercut anchor as described in the present invention.

With reference to FIGS. 6, 6a and 6b and according to a second embodiment of the present invention, a self-undercut anchor 110 is shown. In this second embodiment, the cutting tip portion 115 consists of a plurality of cutting portions 116 thereon without any carbide bit (not shown) as was the case in the first embodiment. A key 163 is still present on the self-undercut anchor 110; however, said key 163 is located on an upper section 168 of the cutting tip portion 115 instead of on the threaded drill rod 120. The key 163 can be positioned between two adjacent spreading lamellae 132 of the cutting tip portion 115. A worker skilled in the relevant art would appreciate that said key 163 could be located on the threaded drill rod 120, as is specifically shown in FIG. 6*a*. With specific reference to FIG. 6*b*, the spreading lamellae 132 are shown having been forced downwards and spread out over the cutting portions 116 of the cutting tip portion 115. In said FIG. 6*b*, there are three lamellae 132, each spread over at least 2 cutting portions 116. However, the second embodiment of the self-undercut anchor (not shown) can have a plurality of lamellae 132 and cutting portions 116, provided that there are at least two lamellae 132 and at least eight cutting portions 116, with at least two cutting portions 116 corresponding to each lamella 132, for the device to work optimally. The second embodiment of the self-undercut anchor 110 is otherwise identical to the first embodiment of the self-undercut anchor (not shown).

With reference to FIG. 7 and according to a third embodiment of the present invention, the self-undercut anchor 210 is shown with an alternative setting tool 235. The setting tool 235 consists of a lower setting tool portion 250 that includes two protrusions 251, 252 that extend downwardly therefrom. Said protrusions 251, 252 fit into corresponding recessions 256 located on the upper extremity 269 of the bore hole sleeve 225. The upper extremity 269 of the bore hole sleeve 225 in this third embodiment is significantly wider than the upper extremity (not shown) of the first embodiment, such that it completely fits into the bore hole (not shown). Said upper extremity 269 also has a sloping lower surface 271 to fit flush into said bore hole (not shown). As there is no key in this embodiment, either of the protrusions 251, 252 are designed to align with the carbide bit 264 such that the spreading lamellae 232 do not spread out over said carbide bit 264.

Figure 9:
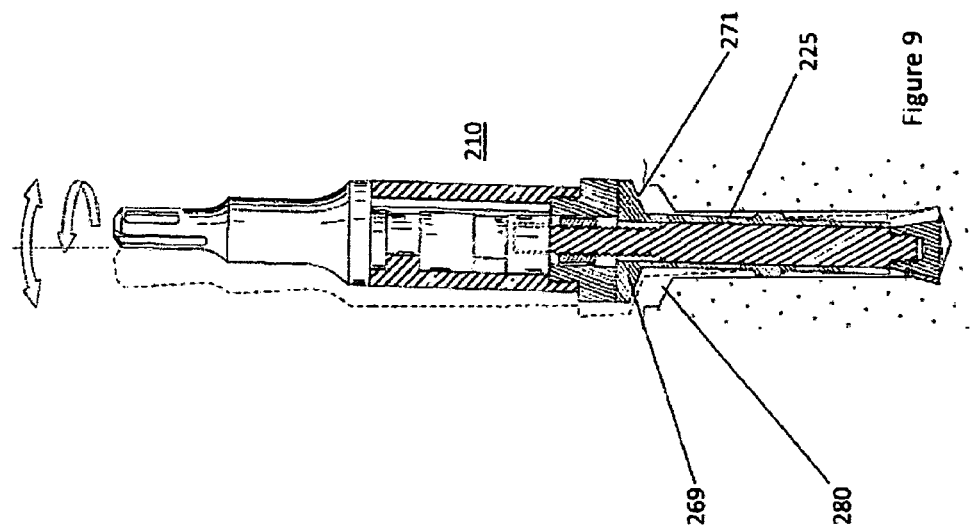
FIG. 9 is a cross-sectional view of the movement of the setting tool to create the undercut according to a third embodiment of a self-undercut anchor as described in the present invention.
Figure 8:
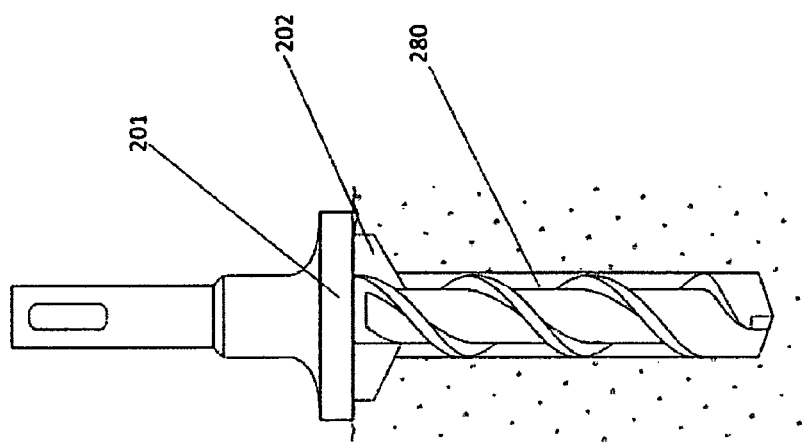
FIG. 8 is a cross-sectional view of a step drill bit drilling a bore hole according to a third embodiment of the present invention.

With reference to FIGS. 8 and 9, a drillbit 201 is shown drilling a bore hole 280. The drillbit 201 is comprised of an additional tooth 202 that can cut a wide upper area into said bore hole 280. Once the bore hole 280 is created, the self-undercut anchor 210 is inserted within it, as is shown in FIG. 9. As was the case in the first embodiment, the self-undercut anchor 210 is rotated and pivoted about as demonstrated by the arrows, which helps create the undercut. The sloping lower surface 271 of the upper extremity 269 of the bore hole sleeve 225 is shown above the bore hole 280 while the self-undercut anchor 210 creates the undercut.

With reference to FIGS. 10 and 10*a*, the undercut has been created and the self-undercut anchor 210 is set and has been forced downwards, as represented by the arrows. The lamellae 232 have been spread over the cutting tip portion 215 of the self-undercut anchor 210, and the upper extremity 269 of the bore hole sleeve 225 is secured within the bore hole 280. The sloping lower surface 271 of the upper extremity 269 of the bore hole sleeve 225 is nearly flush against a corresponding ridge 281 of the bore hole 280.

With reference to FIGS. 11 and 11*a* and according to a fourth embodiment of the present device, the self-undercut anchor 310 is shown. In this fourth embodiment, the mechanism within the setting tool 335 used to set the anchor as shown in FIGS. 4 and 5 has been removed. Instead the setting tool 335 is engaged with and can be disengaged from a semi-cylindrical shaft 334 by means of a ball bearing 336. The setting tool 335 is comprised of a small annular recession (not shown) for engagement with steel balls 337 of the semi-cylindrical shaft 334. The ball bearing 336 is well known in the art and primarily comprises of a steel ball 337 and a spring 338 to bias said steel ball 337 against the small annular recession (not shown) of the setting tool 335. A worker skilled in the relevant art would appreciate that any type of ball bearing could be utilized here in order to lock into place a setting tool with a cylindrical shaft without departing from the spirit and scope of the invention.

Figure 13:
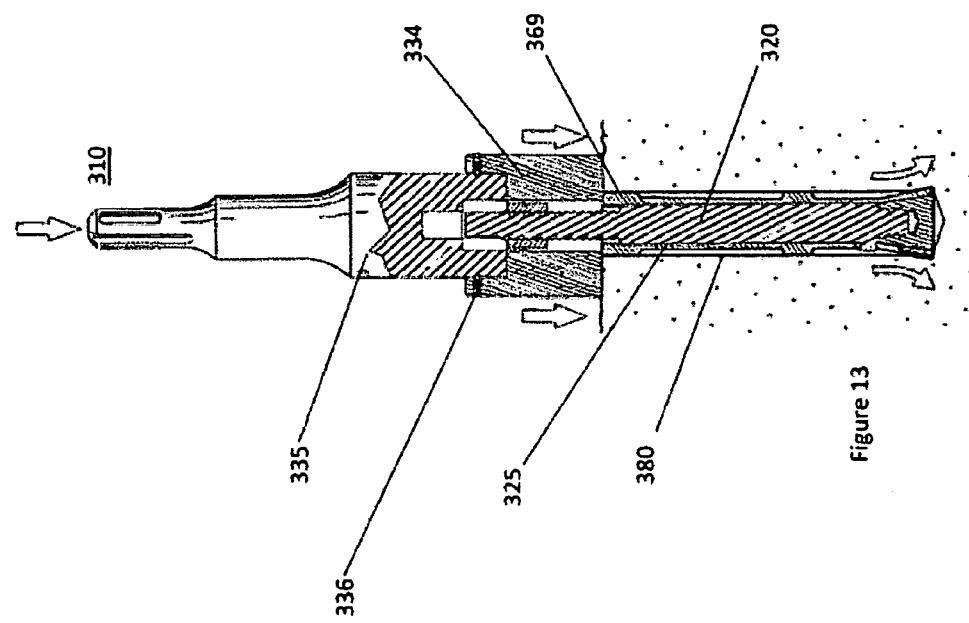
FIG. 13 is a cross-sectional view of the addition of the semi-cylindrical shaft setting the anchor of the self-undercut anchor according to a fourth embodiment of the present invention.
Figure 12:
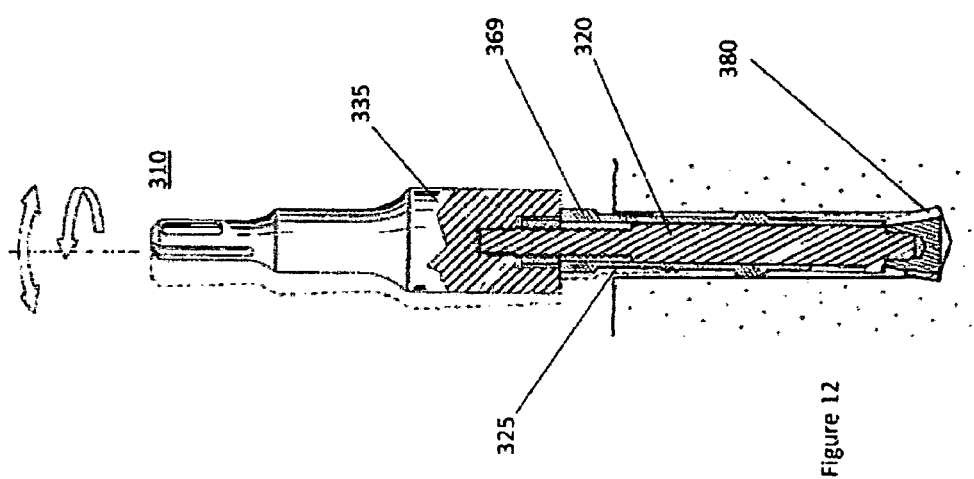
FIG. 12 is a cross-sectional view of the movement of the setting tool to create the undercut according to a fourth embodiment of a self-undercut anchor as described in the present invention.

With reference to FIGS. 12 and 13 and according to a fourth embodiment of the present invention, the self-undercut anchor 310 is shown drilling the undercut in the bore hole 380 and setting the self-undercut anchor 310 with the use of the setting tool 335 and semi-cylindrical shaft 334. Once the undercut has been created as shown in FIG. 12, the semi-cylindrical shaft 334 is engaged with the setting tool 335 by locking into place the ball bearings 336 into the small annular recession (not shown) of said setting tool 335. The semi-cylindrical shaft 334 is then inserted over the threaded drill rod 320 to rest onto the upper extremity 369 of the bore hole sleeve 325. The self-undercut anchor 310 is then forced downwards by means of a drill (not shown) to enlarge the lowermost end of the bore hole 380, which sets the anchor.

Figure 14:
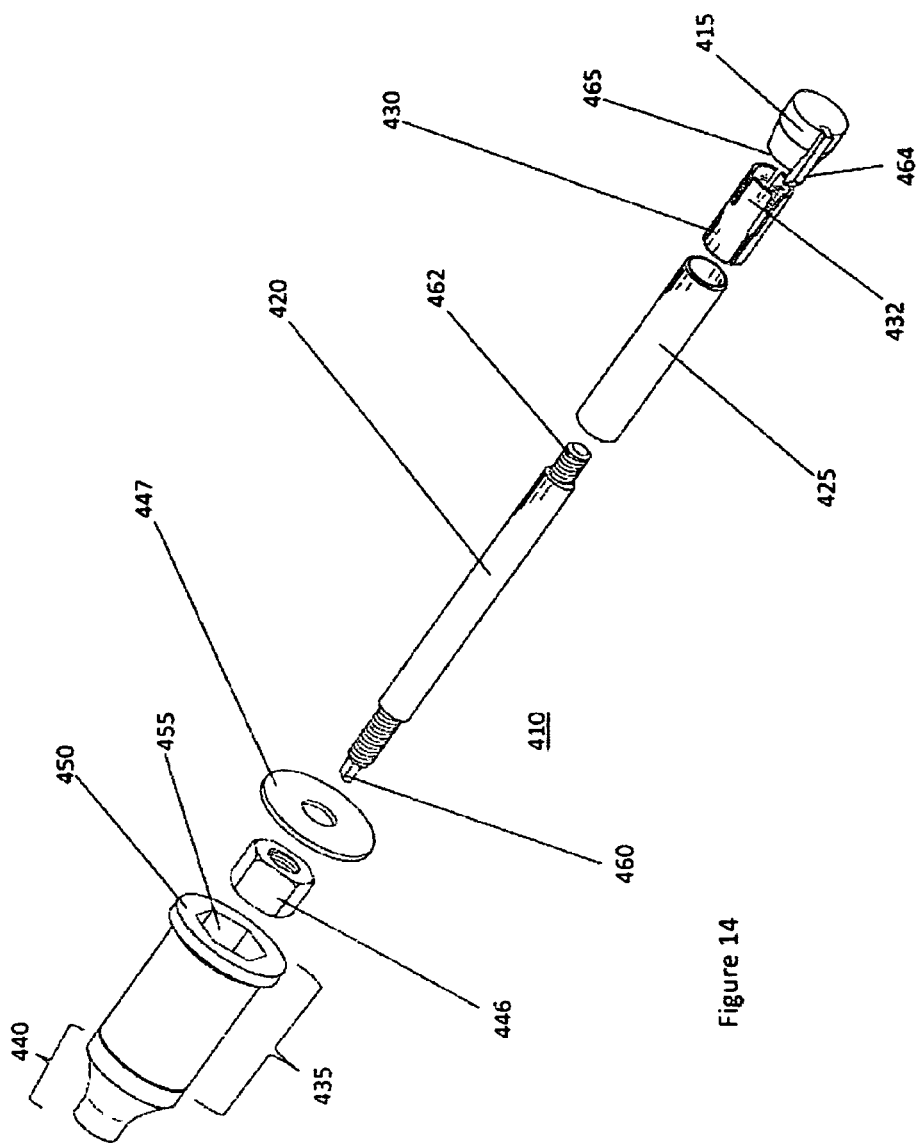
FIG. 14 is an exploded perspective view illustrative of a fifth embodiment of a self-undercut impact anchor as described in the present invention.

With reference to FIGS. 14 and 14*a* and according to a fifth embodiment of the present invention, a self-undercut impact anchor 410 is preferably comprised of a cutting tip portion 415, a threaded drill rod 420, a bore hole sleeve 425, an anchor 430 with spreading lamellae 432, a setting tool 435 and a drill connector portion 440. The principal difference in this fifth embodiment of the self-undercut anchor is that the carbide bit 464 also acts as a guide, thus removing the need for a key, to be inserted in between two spreading lamellae 432. The self-undercut impact anchor 410 utilizes a washer 447 and nut 446 to create an added connection between the drill rod 420 and the setting tool 435. The self-undercut impact anchor 410 is for use in the later insertion and setting of anchors into concrete, stone, masonry and cementuous materials. In this embodiment, the drill connector portion 440 is constructed and arranged to be releasably secured to an impact drill (not shown) by way of a connector (not shown). A lower setting tool portion 450 of the setting tool 435 defines a substantially central opening 455 which receives an upper end 460 of the threaded drill rod 420. A connecting aperture (not shown) of the central opening 455 is shaped in such a way so as to lock into place the specific semi-circular shape, although any lockable shape will suffice as provided above, of the upper end 460 of the threaded drill rod 420. Meanwhile, the lower end 462 of the threaded drill rod 420 receives the cutting tip portion 415, which is threaded thereon, the cutting tip portion 415 having an internally threaded opening (not shown) on an upper surface thereof for threaded engagement with the threaded drill rod 420. A carbide bit 464 is soldered onto the cutting tip portion 415 of the self-undercut impact anchor 410, and extends longitudinally along from one extremity of the cutting tip portion 415 to an open-ended slit 467 in between two adjacent spreading lamellae 432. A worker skilled in the relevant art would appreciate that despite the fact that only one carbide bit is shown, two or more carbide bits could also be present at opposing ends of the cutting tip portion without departing from the scope of the invention.

With further reference to FIGS. 14 and 14*a*, when in use, the anchor 430 and bore hole sleeve 425 are positioned on the threaded drill rod 420, where the spreading lamellae 432 of the anchor 430 sit on an upper edge 465 of the cutting tip portion 415. The open-ended slit 467 located on the anchor 430 between two adjacent lamellae 432 is designed to receive the carbide bit 464 of the cutting tip portion 415. The location of the carbide bit 464 is crucial as it specifically positions the lamellae 432 around said carbide bit 464 such that the lamellae 432 cannot spread over and cover said carbide bit 464 when setting the self-undercut impact anchor 410, as is further explained below. Once the anchor 430 and bore hole sleeve 425 are positioned on the threaded drill rod 420, the washer 447 and the nut 446 are positioned over the upper end 460 of the threaded drill rod 420. The inner circumference of the washer 447 is narrower than the outer circumference of the bore hole sleeve 425, such that the washer 447 can slide along the threaded drill rod 420 and sit on said bore hole sleeve 425, while the nut 446 can sit on the threading of upper end 460 of the threaded drill rod 420, but not having been completely threaded thereon. Meanwhile, the upper end 460 of the threaded drill rod 420 is secured within the opening 455 of the lower setting tool portion 450. While the cutting tip portion 415 in this particular embodiment is conical in shape, a worker skilled in the relevant art would appreciate that said cutting tip portion 415 could be of various other shapes and sizes, including a bell shape, provided that the carbide bit 464 is located on the widest edge of said shape in order to properly create the undercut. The shape of the opening 455 fits perfectly the shape of the nut 446 in order to stabilize the threaded drill rod 420 and its connection to the cutting tip portion 415.

With reference to FIGS. 15 and 15*a* and according to a fifth embodiment of the present invention, an impact drill 471 is shown connected to the setting tool 435. The opening 455 of the lower setting tool portion 450 is shown, having the corresponding dimensions of the nut (not shown) so as to lock said nut (not shown) firmly into place. The connecting aperture 475 of the lower setting tool portion 450 is also shown, shaped in such a way so as to corresponding to the upper portion (not shown) of the threaded drill rod (not shown).

With reference to FIGS. 16 and 17 and according to a fifth embodiment of the present invention, the self-undercut impact anchor 410 is shown before and during the downward impact into a bore hole 480. In this particular embodiment, the self-undercut impact anchor 410 is not drilled downwards; the impact drill 471 forces the self-undercut impact anchor 410 downward, causing only a slight rotation of said self-undercut impact anchor 410 as represented by the arrow in FIG. 17. Said slight rotation causes the carbide bit 464 to create a small trajectory 482 along said bore hole 480. A worker skilled in the relevant art would appreciate that another type of drill could be used to hammer the impact anchor 410 straight down rather than as shown in FIG. 17, and once the impact anchor 410 has reached the extremity of the bore hole 480, it is spun therein to create the requisite undercut.

Figure 17A:
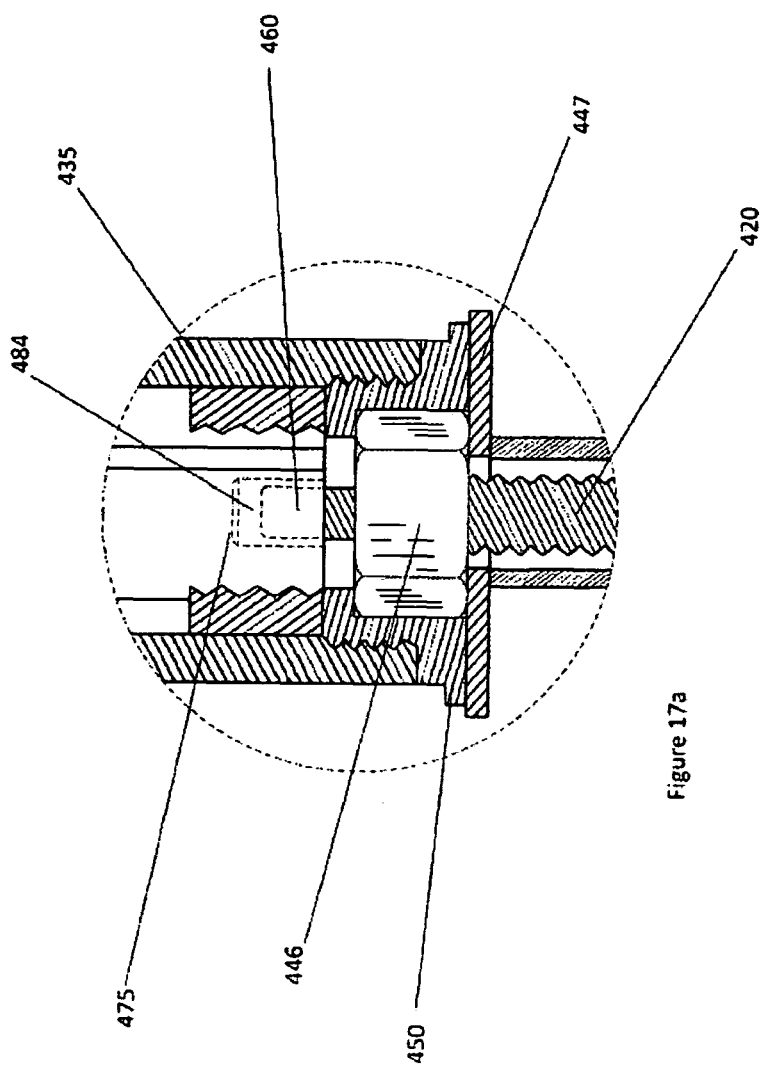
FIG. 17a is a detailed cross-sectional front view of a nut fastened in between a washer and a lower setting tool portion, according to a fifth embodiment of a self-undercut impact anchor as described in the present invention.

With reference to FIG. 17*a*, the nut 446 is shown flush against the washer 447 and inserted within the central opening (not shown) of the lower setting tool portion 455 of the setting tool 435. The nut 446 is lightly threaded onto the threaded drill rod 420. The upper portion 460 of said threaded drill rod 420 is shown within the connecting aperture 475, but is not flush against said connecting aperture 475. Indeed, a gap 484 is shown to illustrate that the pressure being exerted by the impact drill 471 is directed onto the nut 446, said nut 446 being flush against both the washer 447 and the lower setting tool portion 450.

With reference to FIG. 17*b*, the carbide bit 464 of the cutting tip portion 415 has created the trajectory 482 within the bore hole 480 by virtue of being forced downward and slightly rotated. As is shown, the width of the cutting tip portion 415 and carbide bit 464 is still wider than the diameter of the bore hole 480 apart from the trajectory 482 that was created by virtue of the path of said carbide bit 464.

With reference to FIG. 18 and according to a fifth embodiment of the present invention, a first arrow 486 represents the movement of the setting tool 435 and impact drill 471 disconnecting the upper end 460 of the threaded drill rod 420 from the connecting aperture 475 located within the setting tool 435. This allows for the movement of the setting tool 435 to be independent from the threaded drill rod 420 and cutting tip portion 415, as the setting tool 435 is in an unlocked and disengaged position from the threaded drill rod 420.

With reference to FIG. 19 and according to a fifth embodiment of the present invention, a second arrow 487 represents the drilling motion of the impact drill 471 downward. This motion forces the nut 446 to thread upon the threaded drill rod 420, which in turns forces the spreading lamellae 432 outward and over the cutting tip portion 415, as represented by third arrows 488. At this point, the self-undercut impact anchor 410 is set and the lower setting tool portion 450 is flush against the washer 447 which is in turn flush against the concrete.

With reference to FIGS. 20 and 20*a* and according to a sixth embodiment of the present invention, a self-undercut impact anchor 510 is shown impacting into a bore hole 580. The mechanics of said self-undercut impact anchor 510 are the same as was the case in the fifth embodiment; however, in this case there is both a carbide bit 564 and a key 563. The key 563 is meant to line up with said carbide bit 564, and a worker skilled in the relevant art would appreciate that said key 563 is machined onto the threaded drill rod 520 but could be attached in a number of other ways as known in the art. In this second embodiment, an open-ended slit 567 located on the anchor 530 between two adjacent lamellae 532 is designed to receive the key 563 of the threaded drill rod 520. The alignment of said key 563 with the carbide bit 564 is important as it specifically positions the lamellae 532 around the carbide bit 564 such that the lamellae 532 cannot spread over and cover said carbide bit 564 when setting the self-undercut impact anchor 510. Otherwise, the self-undercut impact anchor 510 works in the same fashion as was the case in the fifth embodiment.

With reference to FIGS. 21, 21*a* and 22 and according to a seventh embodiment of the present invention, the fully assembled cutting tip portion 615 is further comprised of a lower removable cutting tip portion 617 and an upper removable cutting tip portion 618. The lower removable cutting tip portion 617 has a threaded interior 619 thereon, which is meant to thread onto a threaded portion 621 of the upper removable cutting tip portion 618. The lower removable cutting tip portion 617 is further comprised of a carbide bit 664, which, as was the case in some of the other embodiments, will be aligned with a key 663 located between two spreading lamellae 632. Meanwhile, the upper removable cutting tip portion 618 is also comprised of an inner threaded portion 622 thereon for mating in threaded engagement with the lower end 662 of the threaded drill rod 620. The separation of the cutting tip portion 615 into the upper and lower removable cutting tip portions 618, 617 allows for the easy addition and removal of these portions. Further, the lower removable cutting tip portion 617 can be completely made out of carbide rather than just the carbide bit 664. An additional advantage of this system is that it allows the carbide bit 664 and lower cutting tip portion 617 to be machined of carbon steel or braised carbide, while the upper cutting tip portion 618 and remainder of the self-undercut anchor (not shown) could be machined in stainless steel or other durable material. As such, it would allow for the lower cutting tip portion 617 to rust or get used independently from the remainder of the self-undercut anchor (not shown).

Many modifications of the embodiments described herein as well as other embodiments may be evident to a person skilled in the art having the benefit of the teachings presented in the foregoing description and associated drawings. It is understood that these modifications and additional embodiments are captured within the scope of the contemplated invention which is not to be limited to the specific embodiment disclosed.

What is claimed is:

1. A self-undercut expansion anchor for enlarging a lowermost end of a bore hole, the self-undercut anchor comprising:
   a. a drill connector portion operatively connected to a drill;
   b. a setting tool connected to the drill connector portion, said setting tool having a lower setting tool portion comprised of a central opening on an underside thereof;
   c. a threaded drill rod sized to fit into the bore hole, said threaded drill rod further comprising:
      i. an upper end, inserted into the central opening of the lower setting tool portion and engaged with the setting tool; and,
      ii. a lower end;
   d. a bore hole sleeve positioned on the threaded drill rod to be slid into the bore hole;
   e. an anchor positioned on the threaded drill rod and connected to the bore hole sleeve to be slid into the bore hole; and,
   f. a cutting tip portion connected to the lower end of the threaded drill rod and engaged with the anchor for enlarging a lowermost end of the bore hole.

2. The self-undercut expansion anchor of claim 1, wherein the central opening of the setting tool portion is further comprised of a connecting aperture to lock into place the upper end of the threaded drill rod with a lockable shape.

3. The self-undercut expansion anchor of claim 1, wherein the threaded drill rod and cutting tip portion are an integral, one-piece unit.

4. The self-undercut expansion anchor of claim 1, wherein the cutting tip portion is engaged in threaded engagement with the lower end of the threaded drill rod.

5. The self-undercut expansion anchor of claim 1, wherein the cutting tip portion is further comprised of at least one carbide bit to create an undercut in the lowermost end of the bore hole.

6. The self-undercut expansion anchor of claim 1, wherein the cutting tip portion is further comprised of cutting portions to create an undercut in the lowermost end of the bore hole.

7. The self-undercut expansion anchor of claim 1, wherein the cutting tip portion is further comprised of an upper and lower removable cutting tip portion.

8. The self-undercut expansion anchor of claim 1, wherein the anchor is further comprised of at least two spreading lamellae.

9. The self-undercut expansion anchor of claim 5, wherein the carbide bit extends longitudinally from the cutting tip portion allowing for positioning between two adjacent spreading lamellae of the anchor.

10. The self-undercut expansion anchor of claim 9, wherein the spreading lamellae are guided along the carbide bit so as to properly spread out over the cutting tip portion.

11. The self-undercut expansion anchor of claim 5, wherein the carbide bit can be soldered, brazed or machined onto the cutting tip portion.

12. The self-undercut expansion anchor of claim 1, wherein the lower setting tool portion has a diameter wider than that of the bore hole and the threaded drill rod.

13. The self-undercut expansion anchor of claim 1, wherein the threaded drill rod is further comprised of a key positioned between two adjacent spreading lamellae and aligned with a carbide bit of the cutting tip portion.

14. The self-undercut expansion anchor of claim 1, wherein the cutting tip portion is further comprised of an upper section having a key positioned between two adjacent spreading lamellae.

15. The self-undercut expansion anchor of claim 1, wherein the lower setting tool portion is further comprised of at least two protrusions extending downwardly therefrom.

16. The self-undercut expansion anchor of claim 15, wherein the bore hole sleeve is further comprised of an upper extremity, said upper extremity comprised of:
   a. at least two recessions correspondingly designed to receive the at least two protrusions; and,
   b. a sloping lower surface to fit flush into an upper area of the bore hole.

17. The self-undercut expansion anchor of claim 1, further comprising an abutment portion positioned between the bore hole sleeve and the anchor for engagement with the inner wall of the bore hole.

18. The self-undercut expansion anchor of claim 1 further comprising:
   a. a semi-cylindrical shaft for engagement with the setting tool; and,
   b. a small annular recession on the setting tool for engagement with two or more spring-loaded ball bearing positioned on the semi-cylindrical shaft.

* * * * *